United States Patent Office 3,495,106
Patented Feb. 10, 1970

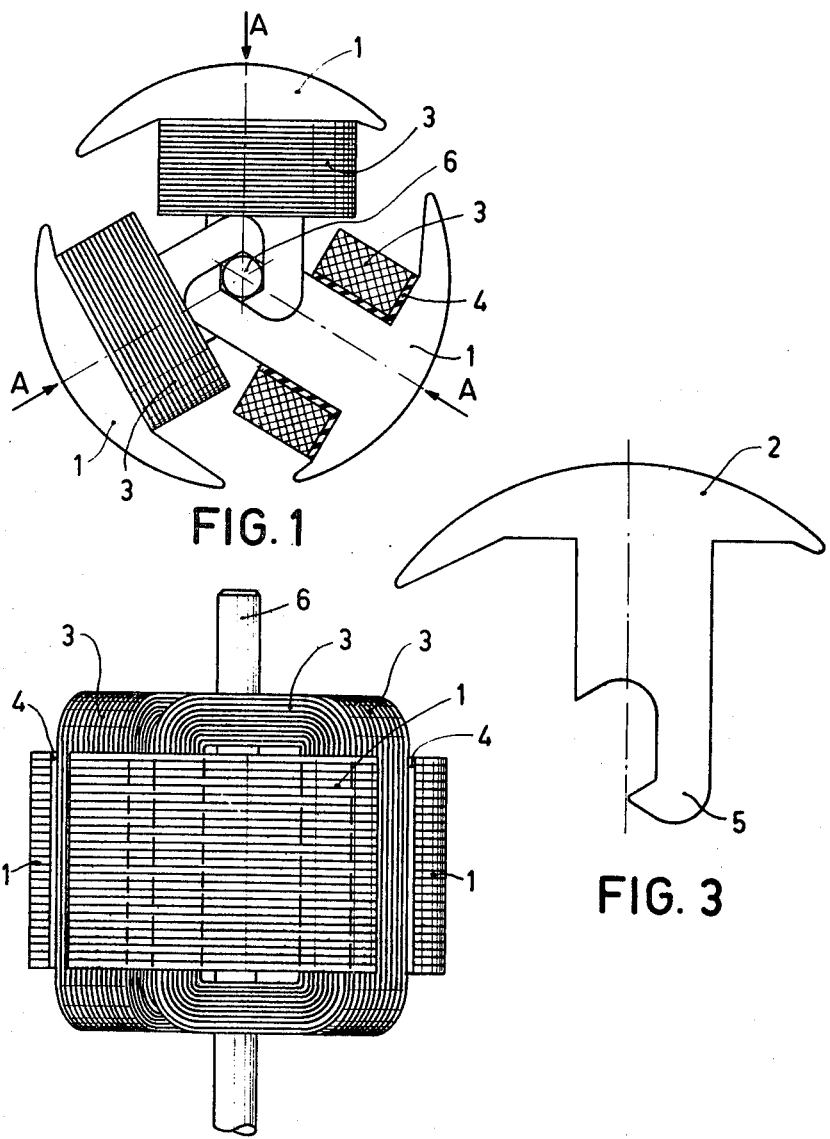

3,495,106
SALIENT POLE ROTOR ASSEMBLY
Wilhelmus Leonard Louis Lenders, Emmasingel, Eindhoven, Netherlands, assignor, by mesne assignments, to U.S. Philips Corporation, New York, N.Y., a corporation of Delaware
Filed Jan. 26, 1968, Ser. No. 700,774
Claims priority, application Netherlands, Feb. 14, 1967, 6702187
Int. Cl. H02k *1/18, 1/28*
U.S. Cl. 310—42                                           8 Claims

ABSTRACT OF THE DISCLOSURE

A rotor assembly for a small electric motor in which separate coil carrying components, have a pole piece at one end and a hooked projection at the opposite end. The hooked projection of the components are secured together by a centrally placed rotor shaft, thus providing a rigid assembly.

---

The invention relates to an electric motor, in particular a laminated rotor for a small electric motor, in which a number of separate components are secured to a central rotor shaft, sleeve or pin exclusively by means of the shaft, sleeve or pin.

Prior art rotors formed of separate components are mainly used in those cases in which it is impracticable or undesirable for technical reason to manufacture the device as one unit. This, the case type of construction as used with laminated rotors for small electric motors, has the separate components formed by T-pole pieces and in order to make optimum use of the advantages of previously wound coils it is often desirable to slide the coils around the limb of each T-pole piece and then to secure the pole pieces to the rotor shaft.

In a known rotor of the above described type, the pole pieces are provided on the side of the shaft with a projecting part comprising a perforation for the shaft, the projecting part in the axial direction having a thickness which is approximately equal to $1/n$ times the thickness of the remaining part of the pole piece where $n$ is the number of pole pieces. As a result of this the pole pieces obtain a complicated shape and require several operations for assembling.

As a rule the separate components of the rotor will have to stand in a certain angular relation with each other. For example, in the case of a rotor having three poles, the pole pieces mutually must encloses angles of 120°. In the case of the above-mentioned known rotor this means that the shaft will have to be provided with a rather heavy driving fit since otherwise the frictional torque on the shaft will be small. This is caused by the fact that the diameter of the shaft in such a small rotor is small and that the projecting part of the pole piece on the side of the shaft only has a thickness which is equal to a part of the thickness of the pole piece. Another possibility is the use of an additional end plate to which the pole pieces are rigidly secured.

It is an object of the invention to mitigate these drawbacks and the invention is characterized in that each separate component comprises a hook-like extremity which engages about the shaft, sleeve or pin, each separate component being enclosed both in the radial and in the tangential direction by the shaft, sleeve, or pin and the remaining separate components.

The hook-like extremity in the construction according to the invention is very simple to realize in many cases. In a laminated rotor this involves no complication in stamping the rotor plates. In devices in which the separate components are manufactured by means of a moulding or sintering process, the absence of a perforation for the shaft will in many cases be a significant advantage.

In the case of a laminated rotor for a small electric motor there are important additional advantages. By a correct design, that is to say a design such that no space remains between the pole pieces mutually after inserting the shaft, the magnetic properties of the assembled rotor according to the invention may be made substantially equal to those of a rotor without separate pole pieces. This can be achieved without it being necessary that great requirements are imposed upon the tolerances of the separate rotor plates.

The magnetic properties of the above-mentioned known rotor will be adversely influenced by the projections on the side of the shaft of the pole pieces which have a smaller thickness than the remaining parts of the pole pieces, and by the fact that the contact between those rotor plates which are situated in a common plane at right angles to the shaft can at best be a point contact.

An embodiment of a device according to the invention is characterized in that the separate components are equal to each other. This embodiment has the advantage that the manufacture becomes cheaper. In a device in which the separate components are moulded or sintered, only one mould is necessary. In a laminated rotor the rotor plates can be manufactured by means of one die; in assembling, the shaft automatically is correctly centered. In the rotor according to the prior art construction two types of plates are necessary.

An embodiment of a laminated rotor according to the construction of this invention is characterized in that the rotor coils are wound in known manner ortho-cyclically. As is known ortho-cyclically wound coils have a larger space factor than other coils. The property of ortho-cyclically wound coils which is of importance for this embodiment is the small tolerance of the space factor with which these coils can be manufactured, and also the small tolerance on the mass of each coil. This means that the pole pieces will be equal to each other as regards shape and when stamping tolerances and provided with ortho-cyclically wound coils, they will remain within the tolerance imposed so that the balancing of the rotor will not be required.

A further embodiment is characterized in that the projections of the components in a plane at right angles to the shaft, sleeve or pin do not overlap each other in the case of equal movements in a direction opposite to the radial direction of assembling. This is of importance in machine assembly of the rotor.

In a laminated rotor the lamination stacks, after having been provided with previously wound coils, can be slid towards each other at maximum speed simultaneously in the radial direction after which the shaft is inserted in the axial direction. Thus a very low cycle time can be reached.

A further embodiment is characterized in that the hook-like extremities in the assembled condition enclose a hole having a polygonal shape in cross-section. This renders it possible to use comparatively wide tolerances as regards the dimensions of the hook-like extremity of each separate component without it being necessary that the shaft, sleeve or pin be milled. In addition this means that, in the case of thin, comparatively long shafts, for example, in a small laminated rotor, the shaft after driving-in need not be aligned as is usually necessary as is known with such milled shafts as a result of the deformations to the milled edges on the shaft during driving-in.

In order that the invention may be readily carried into effect, one example of a laminated rotor according to the invention for a small electric motor, for example, for a battery-operated electric gramophone or electric recorder, will now be described in greater detail, with reference to the accompanying drawing wherein:

FIGURE 1 is a front elevation of a three-pole rotor, having ortho-cyclically wound coils, of which one is shown in cross-section.

FIGURE 2 is a side elevation of the rotor shaft shown in FIGURE 1, and

FIGURE 3 is an elevation of a rotor plate of the rotor shown in FIGURES 1 and 2.

The rotor consists of three identical pole pieces 1 which are constructed from a number of plates 2 as shown in FIGURE 3. Each pole piece comprises an ortho-cyclically wound coil 3 which, in order to prevent damage during assembly or operation, is insulated from the pole pieces by a sleeve 4 consisting of a synthetic resin or another suitable material. The separate pole pieces 1 are shaped asymmetrically in order to make maximum space available for the coils. Each pole piece 1 comprises a hooked projection 5, see FIGURE 3, of such a shape that in the assembled condition, see FIGURE 1, the pole pieces form an aperture having in cross-section of hexagonal shape. The cylindrical central body or rotor shaft 6 which is not milled is driven into this hole. By driving-in the shaft, the play between the separate pole pieces is eliminated, as a result of which a rigid assembly is obtained. This rigid assembly provides low resistance to the magnetic flux at the area of the transition from one pole piece to the other. Furthermore, in the assembled structure each separate plate of a pole piece contacts the corresponding plates of the two other pole pieces. For an effective clamping together of the shaft and the pole pieces it was found that the rotor could have a diameter of 16 mms., as for use in a battery-operated magnetic recorder, and that the dimensional tolerances imposed on the stamping dies for the rotor plates need not be smaller than 0.01 mm.

The low magnetic resistance between the pole pieces is further improved because of the fact that no "daubing" of the rotor plates occurs during assembly as in prior art assemblies where the pole pieces have to be assembled under pressure in the axial direction.

The radial direction of assembling of the pole pieces is denoted in FIGURE 1 by the arrows A. As may be seen from the figure the projections of the pole pieces do not overlap with equal displacement in a direction opposite to the radial direction of the assembling A.

As a result of its particular construction, the rotor is suitable for machine manufacture. During assembling the rotor, with coil formers and coils provided, the three pole pieces are slid against each other by machine at maximum speed and simultaneously in the direction A after which the shaft is driven-in in an axial direction. The rotor has then become one rigid assembly and alignment of the shaft and balancing are not required.

What is claimed is:

1. A rotor for a small electric motor, comprising a plurality of separate components secured together by means of a cylindrical central body wherein each separate component has a hook-like extremity which partially surrounds and engages the central body, each separate component being enclosed both in the radial and in the tangential direction by the central body and the adjacent separate components.

2. A rotor assembly for an electric motor comprosing a plurality of separate and radially positioned component members each having a pole piece at one end and a hooked projection at the opposite end, a coil winding adapted to be placed around the component members, and a rotor shaft centrally placed with respect to the separate component members and engaging the hooked projection of each member so as to form a rigid assembly.

3. A rotor assembly as claimed in claim 2 wherein the separate component members are formed from identically shaped laminated plates.

4. A rotor assembly as claimed in claim 3 wherein the coil widings are ortho-cylindrically wound.

5. A rotor assembly as claimed in claim 4 wherein the projection of the separate component members on a plane at right angles to the rotor shaft do not overlap each other.

6. A rotor assembly as claimed in claim 5 wherein hooked projections in the assembled condition form a polygonal shaped aperture.

7. A rotor assembly as claimed in claim 6 wherein each pole piece is asymetrically shaped.

8. An electric motor having a rotor and a stator assembly one of which assemblies comprises a plurality of separate and radially positioned component members each having a pole piece at one end and a hooked projection at the opposite end, a coil winding adapted to be placed around the component members, and a cylindrical body centrally placed with respect to the separate component members and engaging the hooked projection of each member so as to form a rigid assemly.

References Cited

UNITED STATES PATENTS

| 1,608,314 | 11/1926 | Hibbard | 310—269 |
| 1,778,678 | 10/1930 | Knecht | 310—269 |
| 1,838,150 | 12/1931 | Papst | 310—194 X |
| 3,244,919 | 4/1966 | Drenth et al. | 310—261 |

FOREIGN PATENTS

| 205,000 | 12/1908 | Germany. |
| 657,223 | 1/1935 | Germany. |

MILTON O. HERSHFIELD, Primary Examiner

D. F. DUGGAN, Assistant Examiner

U.S. Cl. X.R.

310—218, 269